Nov. 2, 1943. H. J. MURPHY 2,333,386
NUT RETAINER
Filed March 27, 1941
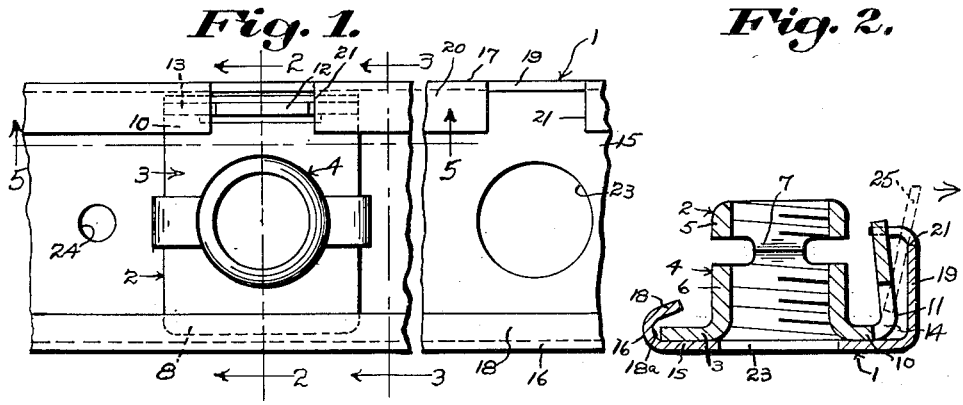
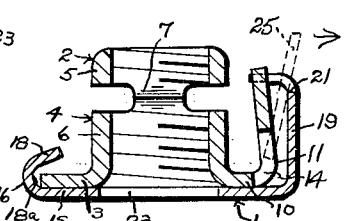
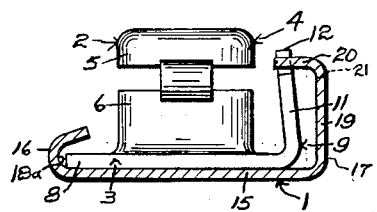
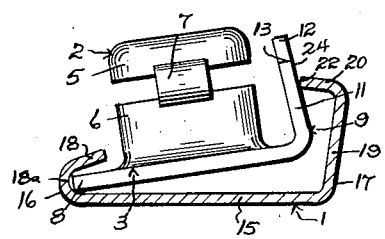
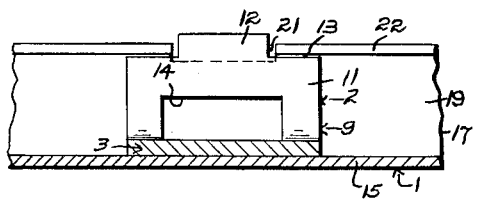
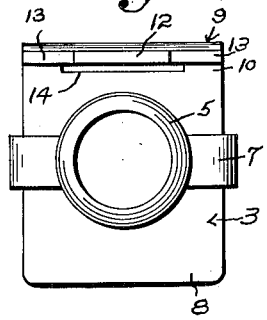
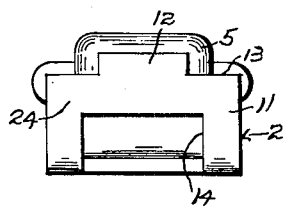
Inventor:
Howard J. Murphy.
By John Todd
Atty.

Patented Nov. 2, 1943

2,333,386

UNITED STATES PATENT OFFICE 2,333,386

NUT RETAINER

Howard J. Murphy, Greenwood, Mass., assignor, by mesne assignments, to Boots Aircraft Nut Corporation, New Canaan, Conn., a corporation of Delaware Application March 27, 1941, Serial No. 385,500

13 Claims. (Cl. 85—32)

This invention relates to improvements in nut channel strips wherein a plurality of nuts are secured in assembly with a channel member which in turn may be attached to the blind side of a support.

The channel strip assembly is useful in airplane manufacture as the strip is a convenient way of preassembling a series of nuts on the side of a thin supporting panel, which side may be inaccessible when the panel is in final secured position.

One of the objects of my invention relates to the construction of the channel device enabling a nut of particular shape to be secured to a strip solely by cooperative engagement between the nut and channel member thereby dispensing with the necessity of a secondary spring cooperating with the nut and channel for effecting the result.

Another object of my invention relates to a novel arrangement for securing the nuts to the channel wherein one or more of the nuts may be moved into or out of secured assembly with the channel without disturbing the attached relationship between other nuts of the series and the channel.

Other objects and uses of my invention will be apparent from inspection of the drawing and specification hereinbelow set forth.

Referring to the drawing, in which I have illustrated a preferred embodiment of my invention:

Fig. 1 is a portion of a strip assembly embodying the invention;

Fig. 2 is a section taken on the line 2—2 of Fig. 1;

Fig. 3 is a section taken on the line 3—3 of Fig. 1;

Fig. 4 is a section similar to Fig. 3, showing the nut being secured to the channel in accordance with my invention;

Fig. 5 is a section taken on the line 5—5 of Fig. 1;

Fig. 6 is a top view of a nut member per se showing the novel construction thereof which operates with the channel member to effect the desired attachment; and Fig. 7 is a side view of the nut member shown in Fig. 6.

Referrring to the drawing, I have shown in Fig. 1 a preferred nut strip device comprising a metal channel member 1 and a nut member 2 loosely retained in assembly with the channel member. Although I have shown one nut only in assembly with the channel member, it is understood that the strip may be formed of proper length to receive any number of nuts and maintain the same in predetermined spaced relation along the length of the strip.

The nut member 2 may take various forms, but I have chosen for purposes of illustration a nut member having a base 3 and a hollow internally threaded shank 4 extending outwardly from the base. The shank of the nut member illustrated provides a locking feature in the form of a threaded portion 5 at its outer end displaced axially relative to the main body 6 of the shank and tied to the body 6 by the resilient loops 7. The end portion 5 is forced axially outwardly when a screw is threaded through the shank bore so as to exert an axial tension on the screw. This locking feature is well known in the art and forms no part of my present invention.

The base 3 of the nut member has a flat side 8 and a wing 9 is integrally joined to the marginal edge of an opposite side 10. The wing 9 extends from the base 3 in the direction taken by the shank 4 and is disposed in spaced substantially parallel relation to the same. The body 11 of the wing 9 preferably has the same width as the base portion, but the wing provides a central free end portion or projection 12 which is reduced in width from the body 11 so that the body presents shoulders 13 adjacent the end portion 12 on opposite sides thereof. The body of the wing has an opening 14 adjacent its junction with the base 3. The opening serves three functions in that, first, it makes the nut lighter so as to enhance its suitability for airplane use; second, it permits the wing to be bent up more easily; and, third, it provides a recess for receiving a tool means by which the nut is pried from the channel in purposeful detachment of the nut, as hereinafter described.

The channel member comprises a bottom 15 and side portions 16 and 17 at its longitudinal edges extending in angular relation to the bottom 15. The side portion 16 is substantially rigid and has a free edge portion 18 extending toward the side 17 and spaced from the bottom 15 to provide a seat 18ᵃ for receiving the base 3 of the nut member. The side 17 is substantially higher than the side 16 and yieldable relative to the bottom 15. The side 17 comprises a yieldable portion 19 normally extending in substantially right-angular relation to the bottom 15 and a free edge portion 20 extending toward the side 16 in substantially parallel relation to the bottom 15. The free edge portion 20 has a series of slots 21 therein which extend from the narrow edge 22 of the portion 20 into the yieldable portion 19. The slots 21 are spaced a predetermined distance apart to receive the end portions 12 of the nut member and the length and depth of each of the slots is greater than the respective width and thickness of the end portion 12 whereby the end portions are permitted to float therein.

The bottom 15 has a series of spaced bolt-receiving apertures 23 (Figs. 1 and 2), each of which is disposed opposite one of the slots 21 and slightly larger in diameter than the bores of the nut shanks so as to register therewith in all positions of the limited movement of the respective nuts. The bottom also has smaller apertures 24 (Fig. 1) for receiving rivets and the like attaching means by which the channel is secured to a supporting panel (not shown).

In assembling the nuts with the channel strip the flat side 8 of the base is moved into the seat 18ª of the channel at a point opposite one of the slots 21. The nut, by reason of its relative dimensions, assumes the tipped position shown in Fig. 4 with the outer broad side 24 of the body 11 of the wing 9 engaging the narrow edge 22 of the portion 20. When the nut is subjected to downward pressure, the surface 24 acts as a cam forcing the side 17 outwardly against its inherent tension whereby the shoulder 13 snaps by the free edge 22 to engage behind the portion. At the same time the projection 12 moves into the slot 21 and is held therein by return of the side 17 to normal position.

The nut is now assembled with the channel member and capable of limited transverse movement relative to the channel due to the fact that the width of the nut base 3 is less than the distance between the side portions 16 and 17 adjacent their junction with the bottom 15. The slot 21 has sufficient depth to receive the projection 12 in all positions of the transverse float of the nut base.

The nut is also capable of limited longitudinal movement relative to the channel by reason of the relative dimensions of the projection 12 and slot 21.

Detachment of the nut from the channel is preferably carried out by moving a tool 25 through the slot 21 and into the opening 14 of the wing 9, as shown in Fig. 2. When pressure is exerted on the tool in the direction of the arrow, the side 17 will yield outwardly permitting the nut to be pried loose. This action ordinarily operates to free the nut chosen for detachment without deforming the channel sufficiently to disturb the attached relation of adjacent nuts of the series.

Although I have illustrated and described a preferred embodiment of my invention, I do not wish to be limited thereby because the scope of my invention is best defined by the following claims.

I claim:

1. A nut assembly comprising a channel member having a bottom and side portions, a nut member positioned between said side portions, one of said side portions being yieldable in angular relation to the bottom, and said nut member having integral means cooperating in snap fastener engagement with said yieldable side portion to retain said nut in said channel.

2. A nut assembly comprising a channel member having a bottom and side portions extending in angular relation to said bottom, said side portions having inwardly turned free edge portions, a nut member having a base retained within said channel and a threaded shank extending from said base, one of said side portions being resilient and one side of said base being snapped by said yieldable side portion to position said base in retained position within said channel.

3. A nut assembly comprising a channel member having a bottom and side portions extending from said bottom, a nut member assembled with said channel, said nut member having a base and an internally threaded shank extending from said base, one of said side portions extending in angular relation to said bottom and cooperating with said bottom to provide a seat receiving one side of said base, the other of said side portions being yieldable and having an inwardly extending free edge portion, said base being disposed in said seat and having means adapted to be snapped by said free edge of said yieldable side and engage behind said inwardly extending portion thereof whereby said nut is retained in assembly with said channel between said sides.

4. A nut assembly comprising a channel member having a bottom and side portions extending in angular relation to said bottom, a nut member retained within said channel between said side portions, one of said side portions having an inturned free edge portion with an opening and said nut member having an integral portion, at least part of which is movable into said opening to retain the nut member in said channel and limit the movement of said nut member relative to said channel.

5. A nut assembly comprising a channel member having a bottom and side portions extending in angular relation to said bottom, a nut member retained within said channel between said side portions, one of said side portions having an opening and being yieldable in angular relation to the bottom, said nut member having an integral portion, at least a part of which is movable into said opening, and said nut being movable into retained position within said channel member by reason of the yieldability of said side portion.

6. A nut assembly comprising a channel member having a bottom and side portions extending in angular relation to said bottom, one of said side portions having an inwardly extending free edge portion, said last-mentioned side portion being yieldable and having an opening intersecting its free edge, a nut member retained within said channel between said sides, said nut having an integral portion movable into said opening and operable with the walls of said opening to limit movement of said nut member relative to said channel, and said nut having a shoulder engageable behind said free edge portion to retain said nut in said channel.

7. A nut assembly comprising a channel member having a bottom and side portions extending in angular relation to said bottom, said side portions having inwardly turned free edge portions and one of said side portions being higher than the other, a nut member retained within said channel between said side portions, said nut member having a base and a threaded shank extending from said base, one side of said base being disposed beneath said free edge portion of said shorter side portion and a shouldered portion integral with an opposite side of said base and adapted to be snapped by said free edge of said higher side portion to dispose said shoulder behind said free edge portion thereof.

8. A nut assembly comprising a channel member having a bottom and side portions extending in angular relation to said bottom, said side portions having inwardly extending portions at their free edges, one of said side portions being higher than the other, said higher side being yieldable and having an opening intersecting its free edge, a nut member retained within said channel between said sides, said nut having a projection movable into said opening and operable with the walls of said opening to limit movement of said nut member relative to said channel, said nut having a shoulder adjacent said projection, and said nut adapted to be snapped by said free edge of said higher side to dispose said shoulder behind said inwardly extending portion thereof.

9. A nut assembly comprising a channel member having a bottom and side portions extending in angular relation to said bottom, said side portions having inwardly extending portions at their free edges, one of said side portions being higher than the other, said higher side being yieldable and having an opening intersecting its free edge, a nut member in loose assembly with said channel, said nut member having a base retained within said channel between said sides, a threaded shank extending from said base, and a wing portion integral with said nut base having a projection movable into said opening and operable with the walls of said opening to limit movement of said nut member relative to said channel, said wing portion having a shoulder adjacent said projection, and said wing portion adapted to be snapped by said free edge of said higher side to dispose said shoulder behind said inwardly extending portion thereof.

10. A nut member having a base, a threaded shank extending from said base, and a wing portion extending from said base in spaced substantially parallel relation to said shank, said wing having a free end portion and a shoulder disposed in the plane of said wing adjacent said free end portion.

11. A nut member having a base, a threaded shank extending from said base, and a wing portion extending from said base in spaced substantially parallel relation to said shank, said wing having a free end portion of reduced width and a shoulder adjacent said free end portion, and said wing having an opening therein adjacent its junction with said base.

12. A nut assembly comprising a channel member having a bottom and side portions extending from said bottom, a nut member positioned within said channel between said side portions, one of said side portions being yieldable in angular relation to the bottom and said nut being snapped into retained position with said channel by reason of said yieldability of said side portion.

13. A nut assembly comprising a channel member having a bottom and side portion extending from the bottom, one of said side portions being yieldable, a nut member positioned within said channel and interengaging means on the channel and nut member for retaining the nut member in the channel, the nut member including a surface arranged to engage said yieldable side portion and effect yieldable movement thereof as the nut is pressed into the channel.

HOWARD J. MURPHY.